United States Patent [19]

Corn et al.

[11] Patent Number: 4,800,539
[45] Date of Patent: Jan. 24, 1989

[54] METHOD AND APPARATUS FOR SEISMIC DIP FILTERING

[75] Inventors: Kruger C. Corn, Ponca City; Gary L. Raney, Stillwater, both of Okla.

[73] Assignee: Conoco Inc., Ponca City, Okla.

[21] Appl. No.: 809,684

[22] Filed: Dec. 16, 1985

[51] Int. Cl.$^4$ .............................................. G01V 1/34
[52] U.S. Cl. ...................................... 367/72; 367/68; 364/421
[58] Field of Search ................. 367/9, 70, 72, 73; 342/176, 180; 340/723, 724, 727; 378/4; 346/33 C, 33 WL, 107 SC; 358/22; 364/421

[56] References Cited

U.S. PATENT DOCUMENTS

| | | | |
|---|---|---|---|
| 3,781,785 | 12/1973 | Balch | 367/70 |
| 4,063,216 | 12/1977 | Chapman et al. | 367/72 |
| 4,463,372 | 7/1984 | Bennett et al. | 358/22 |
| 4,672,546 | 6/1987 | Flinchbaugh | 364/421 |

OTHER PUBLICATIONS

A. H. Balch, "Color Sonagrams: A New Dimension in Seismic Data Interpretation", Geophysics, Dec. 1971, vol. 36, No. 6, pp. 1074–1098.

R. B. Smith et al., "Computer Graphics in Geophysics", Geophysics, Oct. 1972, vol. 37, No. 5, pp. 825–838.

Primary Examiner—Thomas H. Tarcza
Assistant Examiner—Tod R. Swann
Attorney, Agent, or Firm—Ronald J. Carlson; Cortlan R. Schupbach; Frank J. Kowalski

[57] ABSTRACT

A computer-implemented technique for dip filtering of seismic data whereby seismic data of a selected attribute in space and time coordinates is displayed in accordance with a 3-D illumination model such that the apparent angle of illumination of the data relative to an apparent viewing position is optimally adjusted to achieve best differentiation and display presentation of seismic dipping events, fault indications, excessive multiple indications, and the like. The method requires a perceptual view of a seismic section as a 3-D surface from which a vector of images can be derived. Thereafter, vector of images surface components are derived and, in accordance with a pre-determined illumination model, i.e. composed as a function of azimuth and elevation relative to a display, the vector of images of the seismic data are transformed to produce enhancing a specific eye view/illumination alignment. Illumination model parameters may be varied in real-time to achieve an interactive filter-type presentation that enables a display with optimum data presentation.

9 Claims, 9 Drawing Sheets

METHOD AND APPARATUS FOR SEISMIC DIP FILTERING

BACKGROUND OF THE INVENTION

1. Field of the Invention

The invention relates generally to processing and visual display of seismic section data and, more particularly, but not by way of limitation, it relates to an advance in methods of presenting seismic section data in real-time, interactive pseudo-3-D display thereby to enhance certain dipping structures and other anomalies as well as to attenuate multiples.

2. Description of the Prior Art

The prior art recognizes the seismic survey problems associated with dip and related anomalies and the production and display of reliable, meaningful seismic section information, and a number of enhancement techniques, migration representations and the like have been utilized. Conventional approaches to dip filtering involved a user-specified filter shape which is then input to a batch process to directionally enhance or attenuate specific dip angles. In general, prior dip filtering techniques have adhered to static parameter processes and have not sought the capability and advantages of real-time implementation thereby to seek interactively the most informative or useful of multiple filter orientation displays.

SUMMARY OF THE INVENTION

The present invention combines two differing technologies to achieve the objectives of dip filtering, i.e. 3-D shading graphics techniques and image processing technology, in order to generate a unique pseudo-3-D seismic display that may be interactively varied in real-time to generate multiple filter orientation displays. The process can be used for any of cross-line, in-line, and horizontal time-slice of 3-D seismic section data assemblages. The invention consists of hardware, software and the methods required to perform real-time seismic dip filter processing using an illumination model. The method requires a perceptual view of a seismic section as a multi-dimensional (e.g. 3-D) surface from which a vector of images can be derived. The vector of images are surface components of the seismic section and, in accordance with an illumination model, the vector of images of the image subject matter can be transformed to produce a display enhancing a specific dip orientation. Thereafter, the illumination model parameters may be modified or varied in real-time to achieve an interactive seismic dip filter process that enables production of a display with optimum data enhancement.

The present method provides an effective means for enhancement of dipping structure, and other anomalies and attenuation of multiples as they may appear in seismic data displays. The process improves the continuity of displayed seismic events and assists the interpreter to recognize faults in their data. Although the process is primarily directed to display processing and interpretation needs or what is termed post-processing, the present method also has great potential for use in upstream production processing of seismic data.

Therefore, it is an object of the present invention to provide an improved seismic display for recognition of dipping events, faults and the like.

It is also an object of the invention to provide an interactive display method that allows the interpreter to achieve an optimum pseudo-3-D presentation.

It is yet another object of the invention to provide an interactive method that operates in real-time to allow the interpreter optimum parameter definition of seismic section data virtually instantaneously.

It is still another object of the present invention to provide visual representation of seismic data in such manner that illumination model viewing to best advantage may be readily achieved.

It is also an object of the invention to provide an interactive interpretive seismic data display that asserts further effects to the data such as color, texture, shape and shading control thereby to assist operator perception and assimilation of information contained in the data.

Finally, it is an object of the present invention to provide a method for analysis of seismic section data that enables interactive control whereby the data can be viewed in accordance with any of numerous, selected illumination models.

Other objects and advantages of the invention will be evident from the following detailed description when read in conjunction with the accompanying drawings which illustrate the invention.

DETAILED DESCRIPTION OF THE INVENTION

Figure 1:
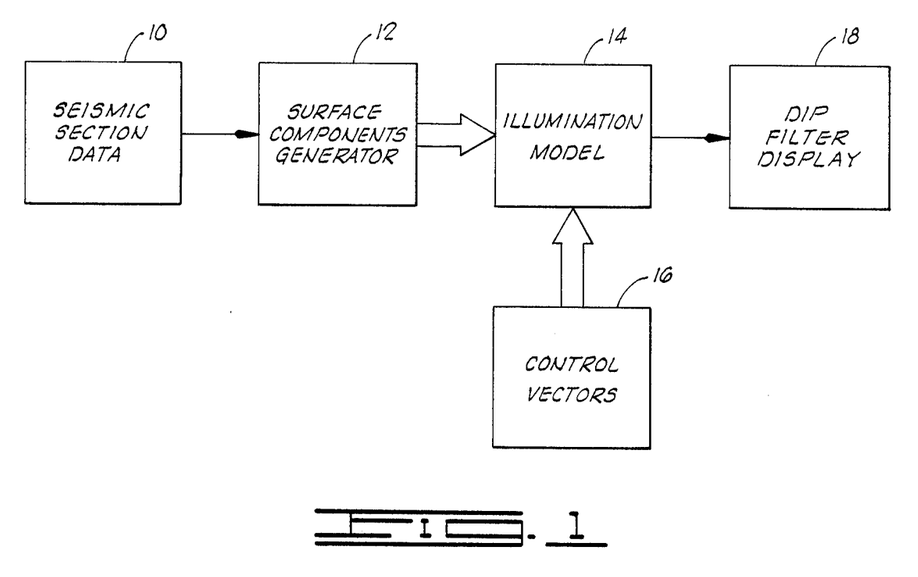
FIG. 1 is a general flow diagram of the processing as carried out in accordance with the present invention.

Essentially, the method of the present invention consists of enhancement of a selected seismic section by treating it as a surface from which component images may be derived. The derived components are then transformed using an illumination model and one or more control vectors to present a visual output or display that is filtered for a specific dip angle. FIG. 1 illustrates a data flow diagram that may result in production of such a display.

Thus, a selected line or section of seismic data at a flow stage 10 is input to a surface components generator 12 which functions to derive the x, y and normalization output components of a selected vector of images, such specific processing to be further discussed below. The seismic section surface components output from stage 12 are then processed in a stage 14 wherein the data is oriented in accordance with an illumination model controlled by one or more input control vectors from a stage 16. The seismic data so weighted and re-oriented is then output as dip filter display stage 18.

Figure 2:
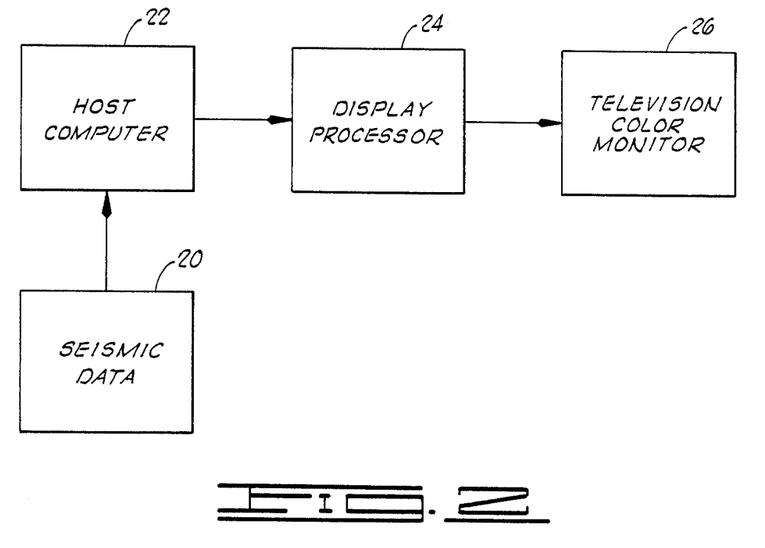
FIG. 2 is a block diagram illustrating equipmentation.

FIG. 2 illustrates an equipment set-up that is suitable for carrying out the method of the present invention. Thus, the basic seismic data is available from a suitable source 20 for input to a host computer 22. Source 20 may be any of the various types of seismic data processing and storage operations and host computer 22 may be such as a VAX model 11/780 and/or 11/730 computers, host computer 22 functioning to effect all processing relative to the surface components generator stage 12 that provides components input to illumination model 14 (FIG. 1). A display processor 24 may be such as a model 75 display processor as produced by International Imaging Systems, Inc. Data output from display processor 24 is then provided by a video monitor 26. Many alternative hardware structures may be utilized in carrying out the invention and one in particular will be discussed further hereinbelow.

Figure 3:
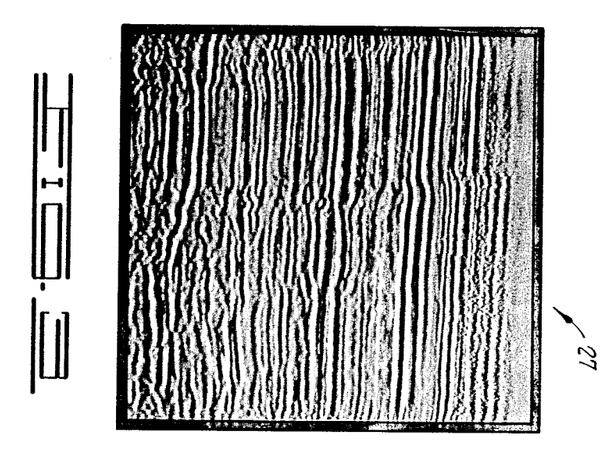
FIG. 3 is a selected seismic section illustrating a seismic survey line containing faults.
Figure 4:
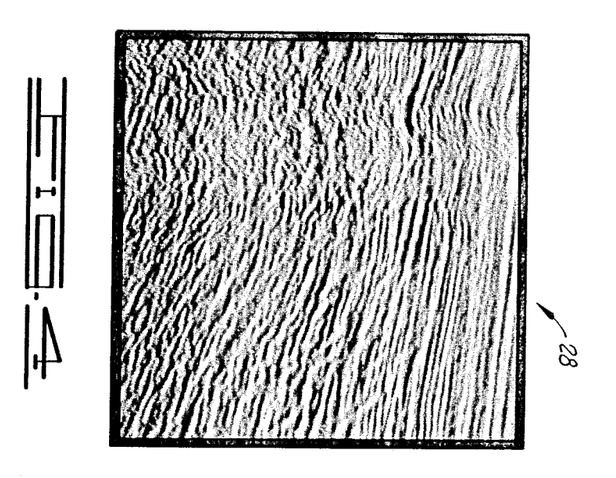
FIG. 4 is a representative seismic section illustrating multiple noise arrival problems.

In operation, an input seismic section is treated as a surface from which surface components in the form of vectors of images can be derived. These derived surface components are then transformed, using an illumination model and one or more control vectors, into a specific dip filtered display. FIGS. 3 and 4 illustrate respective seismic cross-section displays 27 and 28, each in this case being a variable intensity display of the data amplitude attribute. Seismic section display 27 has been particularly included for illustration purposes since it provides a very clear delineation of faults disposed vertically through the structure, and the section display 28 has been selected for its illustration of multiple (noise) arrival problems. Section displays 27 and 28 will be enhanced by the present method as will be discussed below.

Figure 5:
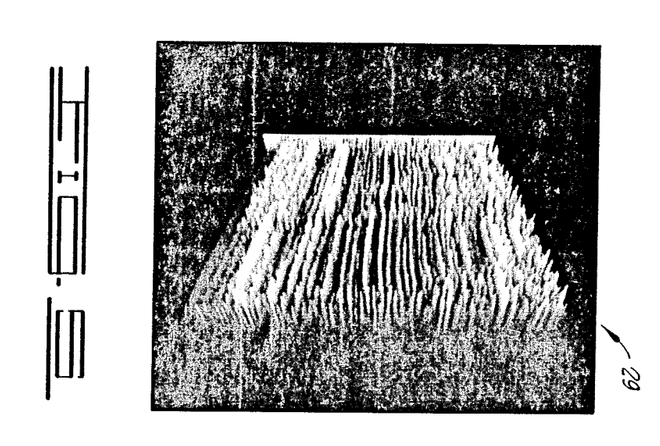
FIG. 5 illustrates a seismic cross-section viewed as a 3-D surface.

FIG. 5 illustrates a 3-D surface depiction, seismic Section 29, that may be developed using the techniques of the present invention. That is, the given seismic section data is developed as a pseudo 3-D surface wherein the seismic data attribute provides color and textural substance of the display. Further, the seismic surface 29 is oriented as to perspective and viewing point relative to an eye view position. Such eye view orientation of the seismic surface is a function carried out in the display processor 24 in accordance with display processor techniques.

Figure 6:
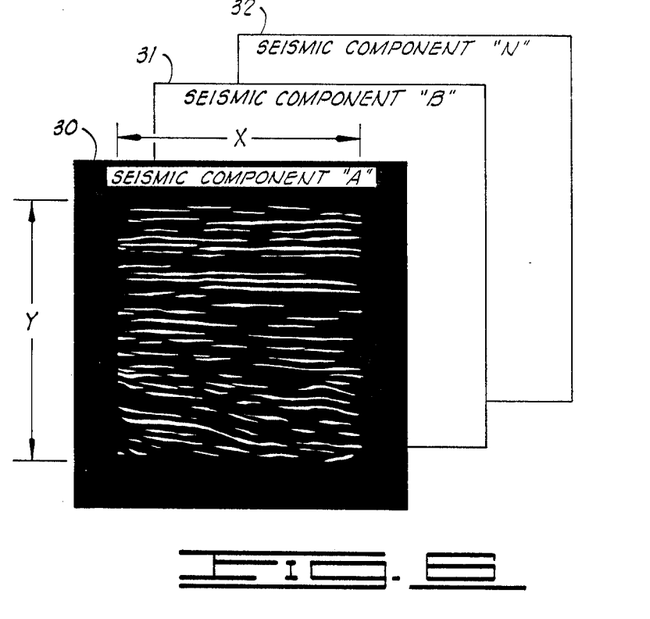
FIG. 6 is a representation of a seismic section reference coordinate system.

The interpretive 3-D displays are formed by deriving surface information, e.g. amplitude or other attribute, from a seismic cross-section, and then this data along with additional seismic component information is input to the interpreter's orientation model format along with display control parameters that describe the interpreter's desired location. A display in 3-D wiggle trace is then generated in accordance with the model. The spatial coordinates are illustrated in FIG. 6 wherein the seismic section is described at coordinate array 30 as an image function I(x,y), where x is the common depth point number of the trace and y is the travel time down the trace, typically in 4 millisecond increments. Additional seismic components as shown at arrays 31 and 32 may be included in overlay or color mixture in providing a final seismic section reference coordinate system for the selected surface or cross-section.

Figure 7:
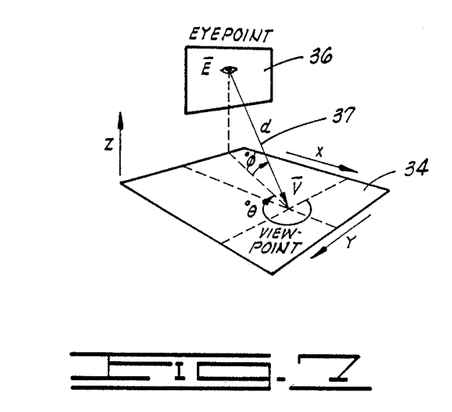
FIG. 7 is a depiction of an apparent view perspective coordinate system.
Figure 8:
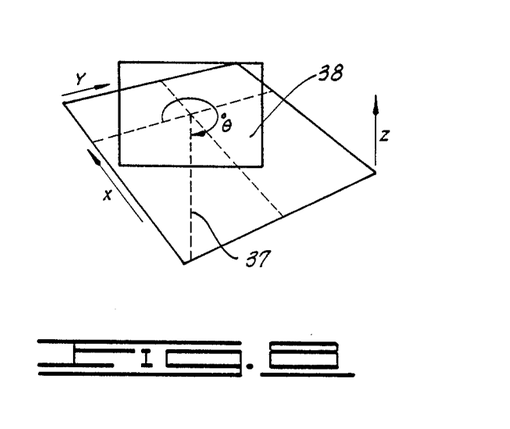
FIG. 8 is a depiction of a display screen coordinate system.

The interpreter's orientation model allows transformation of the interpreter's apparent viewing position from the coordinates of seismic section 34 directly overhead to a perspective coordinate system as from plane 36. Thus, as shown in FIG. 7, the interpreter may specify viewpoint V and eye point E locations or, alternately, viewpoint $\theta_E$ and elevation $\phi_E$ angles and a distance d parameter, as the model input in order to create the desired apparent viewing orientation. This is accomplished in three major steps. First, the model translates the viewpoint V in seismic section coordinates to the point on the section 34 that the interpreter wants to see. Second, the eye point location is defined in three-dimensional space by translating the interpreter's eye point to the desired position E. Next, the eye point, now in an interpreter vantage point coordinate system, must be rotated to a line 37 that positions where the eye is looking with respect to the viewpoint on the seismic surface. A perspective transform is then performed and, as shown in FIG. 8, the results are projected onto a plane 38 that is perpendicular to the line 37 between the interpreter's eye point E and the viewpoint V, and this plane 38 maps the perspective coordinate system as windowed for display on an imaging device.

Figure 9A:
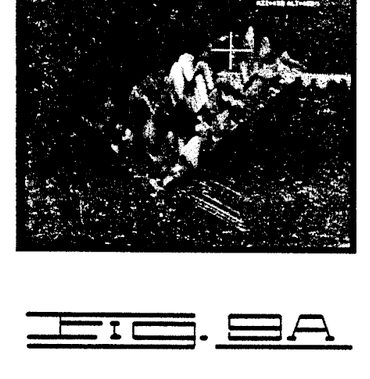
FIGS. 9A, 9B, 9C and 9D are photographic reproductions of the same seismic section data wherein the respective orientation model displays are varied as to selected azimuth, elevation, and apparent viewing distance.

The various viewing positions of the interpreter, i.e. the eye point E simulation, may be moved by adjusting the orientation model in accordance with the input parameters which control angle of movement in azimuth $(-180° \leq \theta \leq +180°)$ and elevation $(-90° \leq \phi \leq +90°)$. Adjustment of the model input parameters enable views of the seismic section surface from any selected angle or distance as shown in FIGS. 9A–9D, and such highlighting and accenting capability enables many effects such as simulation of "squint filter" and other interpretive techniques. FIG. 9A illustrates a section of seismic data as viewed from a simulated eye point at azimuth 45° and elevation 45°; FIG.

Figure 9B:
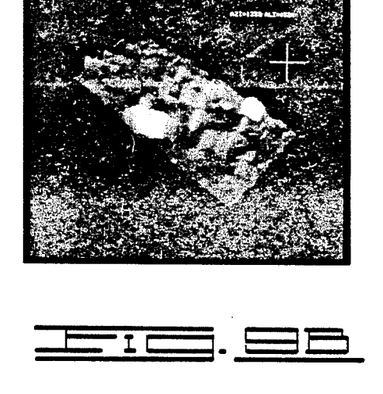
Figure 9C:
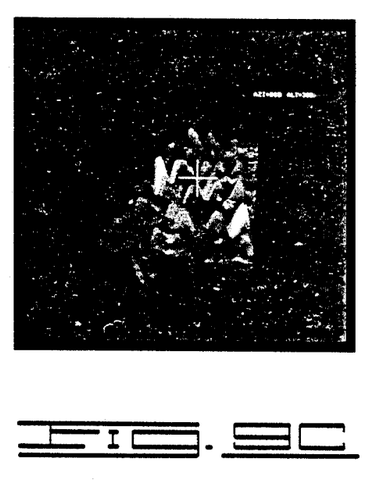
Figure 9D:
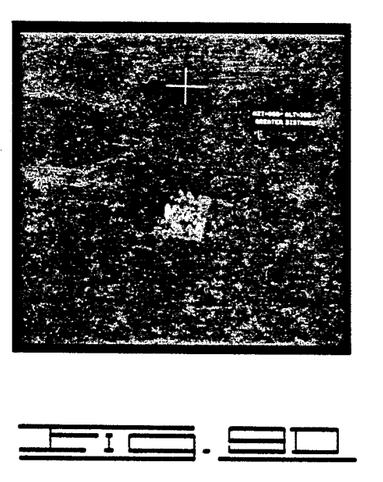

9B illustrates the same data as viewed from azimuth 135° and elevation 45°; FIG. 9C displays the same data as viewed from azimuth 80°, elevation 30° and a short distance d; and FIG. 9D shows the same data as viewed as in FIG. 9C but at a much greater distance d.

In conventional seismic section analysis, the interpreter must rely heavily on trace wave shape for data analysis. When the data attributes are so generated and displayed in variable intensity monochrome, the shape information is frequently hidden if not lost thereby to hinder effective interpretation. Thus, considerable advantage is gained by constructing a pseudo 3-D display of the seismic section such as that of FIG. 5 which due to the perspective transform, emphasizes wave shape and may be further augmented with such as variable intensity monochrome, pseudocolor, or color combination of other attribute data derived from the section.

While third dimensional effects can be provided as above by transformation of the seismic section with an interpretive orientation model, still additional highlights and interpretive advantages may be achieved by transforming the section data in accordance with an illumination model. Section data adhering to an illumination effect enables the ability to filter sharply the specifically-oriented dipping events in the data. Accordingly, it is a valuable technique for an interpreter to have the capability of examining seismic section data at any of selected illumination angles while varying such illumination relationship in real-time.

Given a selected seismic section for illumination model processing, the process develops surface components of a vector of images for each image point which are then transformed for display in accordance with specific apparent viewing and illumination angles. For example, a vector of images can be derived if we let $i(x, t)$ be a seismic cross-section, and if we let $F_1$ be a partial derivative operator in the horizontal direction, and let $F_2$ be a partial derivative operator in the vertical direction. Thus, there is defined $$i_{F1} = F_1[i(x,t)] \tag{1}$$

and $$i_{F2} = F_2[i(x,t)]. \tag{2}$$

We may then establish a normalized vector of images N such that:

$$N = \left[ \frac{i_{F1}}{\sqrt{i_{F1}^2 + i_{F2}^2 + 1}}, \frac{i_{F2}}{\sqrt{i_{F1}^2 + i_{F2}^2 + 1}}, \frac{1}{\sqrt{i_{F1}^2 + i_{F2}^2 + 1}} \right]. \tag{3}$$

Figure 11:
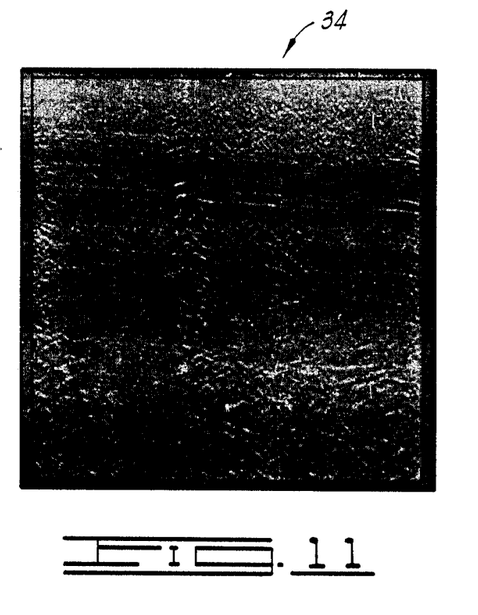
FIG. 11 is a section representation for a normalized partial derivative with respect to the X direction for a normalized vector of images.
Figure 12:
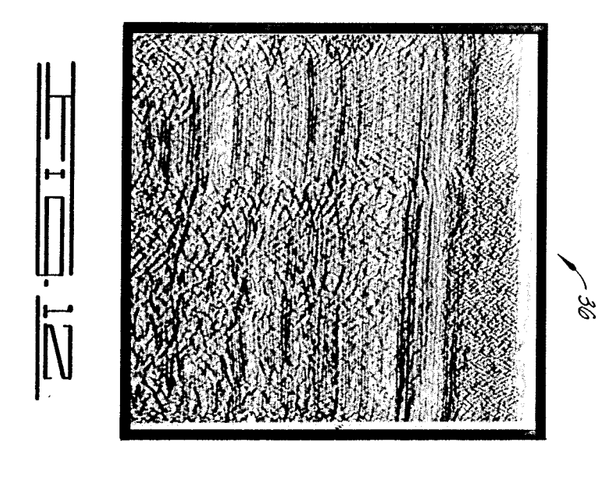
FIG. 12 is a section representation for the normalized partial derivative with respect to the Y direction for the vector of images.
Figure 13:
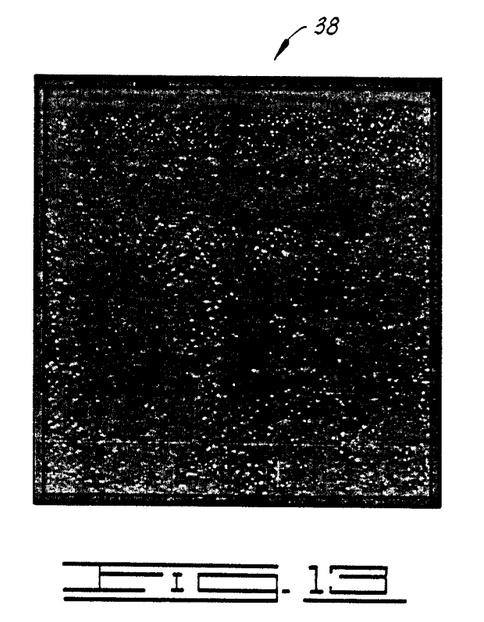
FIG. 13 is the normalization factor of the vector of images.

Scaled versions of the components in the vector of images N are shown in FIGS. 11, 12 and 13. That is, the respective factors of equation (3) are individually displayed as respective sections 34, 35 and 38 as shown in FIGS. 11, 12 and 13 which depict the contribution of, respectively, the x factor, the y factor and the normalization factor of equation (3).

Figure 10:
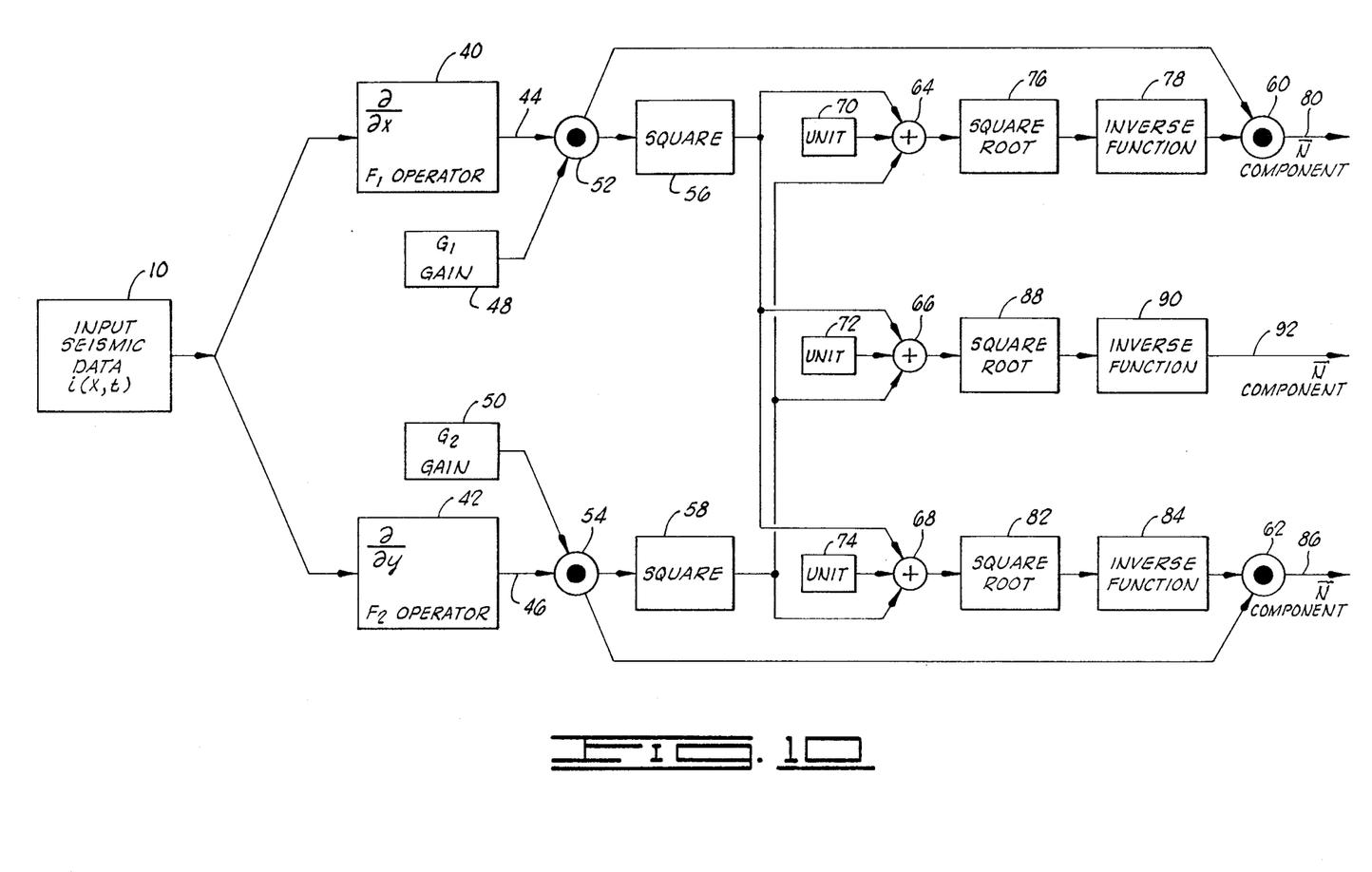
FIG. 10 is a procedural flow diagram of the surface components generator of FIG. 1.

FIG. 10 represents a functional flow diagram of the process taking place within components generator 12 (FIG. 1) to derive the separate N factors or surface components. Thus, the seismic data input 10 is processed at stages 40 and 42 to determine the respective partial derivatives using the $F_1$ operator and $F_2$ operator as present on lines 44 and 46. Scalar gain factors dependent upon the operator are also provided from gain controls 48 and 50 for multiplication at stages 52 and 54. Proper setting of gains 48 and 50 makes sure that the partial derivative values do not get inordinately large. Output from multipliers 52 and 54 is then applied through square stages 56 and 58 as well as to respective output multiplier stages 60 and 62. Data output from square stages 56 and 58 are applied in parallel to each of adder stages 64, 66 and 68. A stabilizing factor from respective unit sources 70, 72 and 74 is also applied through respective adders.

Thus, adder 64 provides data input through a square root stage 76 and inverse function stage 78 and output multiplier 60 to provide a data output 80 that is the x component, i.e. the N component that is a normalized partial derivative of the seismic data input with respect to the x direction. In like manner, the adder 68 through square root stage 82, inverse function stage 84 and multiplier 62 provides data output on a line 86, the N component that is a normalized partial derivative with respect to y. The common channel from adder 66 through a square root stage 88 and inverse function stage 90 provides the normalization factor output on line 92. The respective N surface components for x, y and the normalization factor, on lines 80, 86 and 92 are then processed within the display processor 24 (FIG. 2) to fill out the illumination model and establish the operational dip filter of selected orientation.

Figure 14:
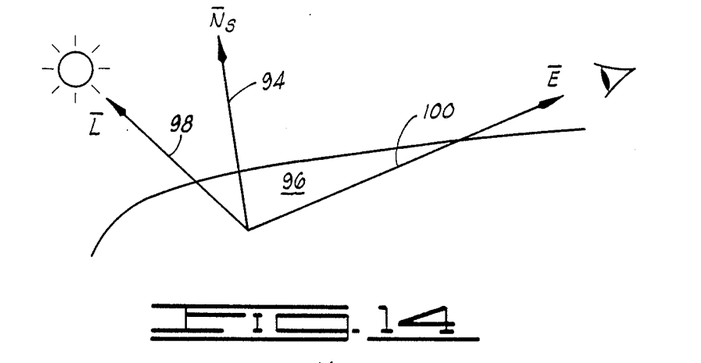
FIG. 14 is a vector illustration of one form of illumination model.

A dip filter is so identified because of its ability to filter specifically-oriented dipping events in seismic data. The present method provides control of dip orientation associated with certain events, and this control is provided by transforming the vector of images or N factor (equation 3) in accordance with an illumination model. An illumination model is illustrated generally in FIG. 14. For instance, given a surface normal vector 94 relative to a surface 96, a reflection intensity is dependent upon the angle between $\overline{N}_s$ and the illumination orientation $\overline{L}$, as well as the angle between $\overline{N}_s$ and the line of sight $\overline{E}$.

Suppose a specific dip orientation $\theta$ to be filtered is given, as well as a parameter $\phi$ that adjusts brightness; then, one or more functions $h_j$ can be described that relates control vectors $\overline{L}_j$ to each of $\theta$ and $\phi$, i.e.

$$L_j + h_j(\theta, \phi). \tag{4}$$

A dip filter display $O(x, t)$ can then be generated using the final result given by $$O(x,t) = \sum_{j=i}^{n} P_j (\overline{N} \cdot \overline{L}_j)^{c_j} \tag{5}$$

where $P_j$ is equal to the display brightness, and $c_j$ is the contrast.

Figure 15:
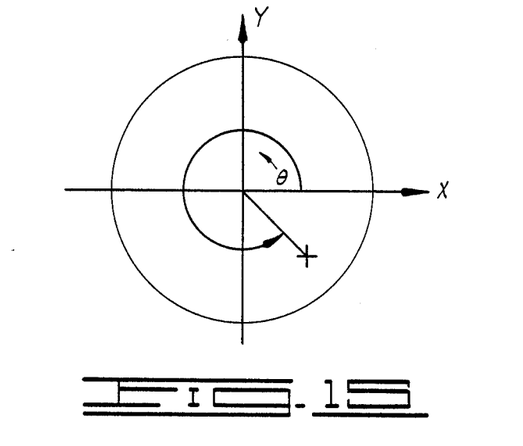
FIG. 15 is a plan view of a video screen showing the coordinate system by which the dip filter orientation angle $\theta$ may be determined.

Interactive control of the display method is enabled as the examining operator or interpreter controls the dip orientation $\theta$ and/or the brightness $\phi$ of the data presentation in real-time. Thus, an operator can control the cursor on the screen of video monitor 26 (FIG. 2) within an x, y coordinate system as shown in FIG. 15. The dip orientation angle $\theta$ is given by the angle measured counterclockwise from the positive horizontal axis to the vector formed by the origin of the coordinate system and the cursor position, i.e. a function $g_1$ can be described to relate x, y to $\theta$, or $$\theta = g_1(x, y). \quad (6)$$

Figure 16:
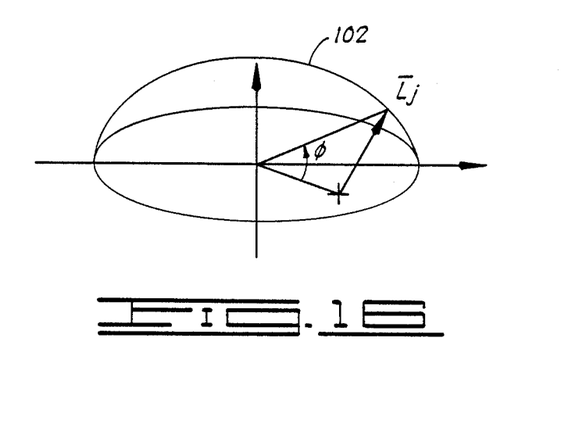
FIG. 16 is a lower angle view showing the unit vector hemisphere where overall surface brightness is determined from the angle $\phi$.

Similarly, $\phi$ is related to the length of that vector, as shown in FIG. 16, such that a function $g_2$ can be described to relate x, y to $\phi$, or $$\phi = g_2(x, y). \quad (7)$$

The function $h_j$ (equation 4) is that which takes $\theta$ and $\phi$ to form the vector $\overline{L}_j$ that lies, in this case, on the unit hemisphere 102 as shown in FIG. 16. Additionally, in the final display result, the terms $P_j$ and $c_j$ can also be used to control display brightness and contrast, and these further controls may be effected either interactively or statically as the interpreter may select.

Figure 17:
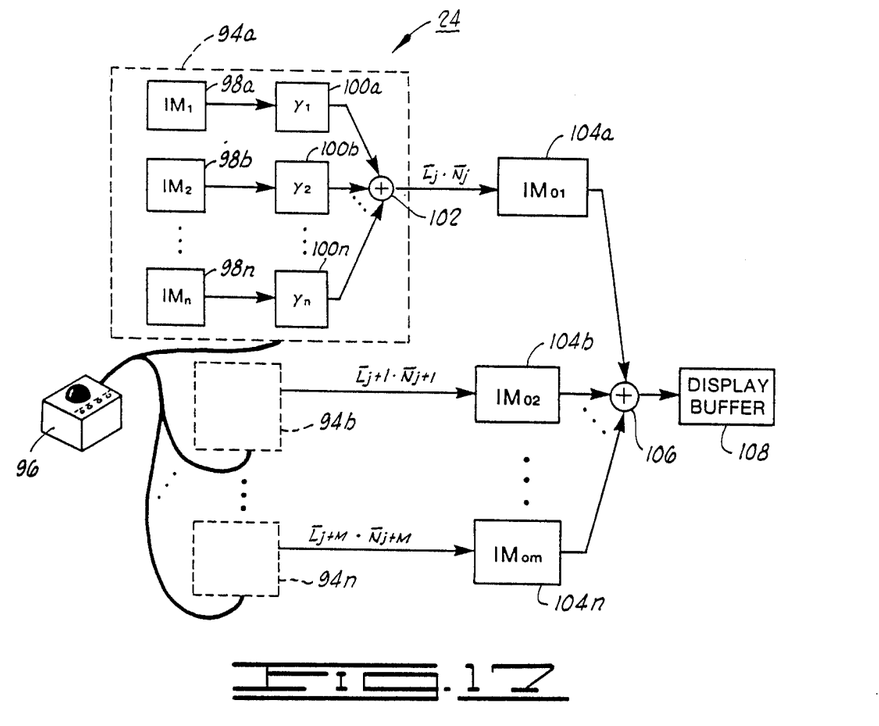
FIG. 17 is a functional hardware configuration to implement the interactive dip filter display in real-time.

FIG. 17 illustrates the functional hardware configuration of display processor 24 suitable for implementation of interactive dip filter display in real-time. As in FIG. 2, the system includes a host computer for receiving input seismic trace data and deriving vector of images surface components. Surface component data is then input to the display processor 24 which, in turn, provides output data to the color monitor.

The display processor 24 (FIG. 17) with necessary image memory and arithmetic hardware includes a plurality of image processing banks 94a–94n which receive and store vector of images surface component data as generated and output from the host computer 22 (FIG. 2). Each of image processing banks 94a–94n is connected for real-time operator control to a track ball 96. Within each image processing bank 94a–94n a plurality of image memory banks 98a–98n receive input of the respective vector of images surface component data, which data is processed through arithmetic hardware stages 100a–100n and final outputs are summed in an adder stage 102 for output and storage in an image memory 104a. The additional image memories 104b–104n receive respective outputs from image processing banks 94b–94n in like manner.

Thus, surface component data input to memory banks 98a–98n constitutes $N_j$ data which is then subjected to the multiplier $L_j$ in the arithmetic stages 100a–100n. The arithmetic hardware 100a–100n provides dot product computations on the vector of images surface components, and the output from adder stage 102 is the product of $L_j$ and $N_j$, a real-time dot product that will yield the final dip filtered result. Two stages of image memory, multipliers and adders are sufficient along with an analog input device, such as user input track ball 96, in order to interactively control parameters of the illumination model. The data output from each of final image memory stages 104a–104n is summed in an adder 106 for output into a display buffer 108 functioning in conjunction with the video monitor.

Figure 18:
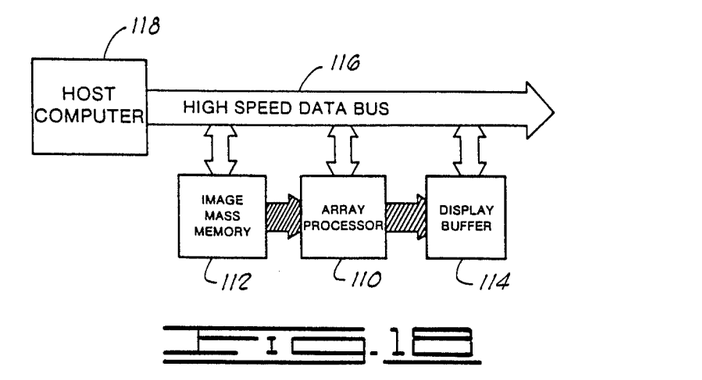
FIG. 18 illustrates an alternative hardware configuration wherein floating point operation is utilized to produce interactive dip filter displays.

An alternative technique can be considered involving hardware illustrated generally in FIG. 18. This hardware includes an array processor and special mass memory hardware as coupled through a display buffer device to enable an output video monitor display with true color capability. Each of memory 112, array processor 110 and buffer 114 are in communication with a high speed data buss 116 from host computer 118. An example of such hardware configuration may consist of an AP/DPS subsystem as available from Aptec Corporation making up the mass memory and array processor, and these components are coupled with a display buffer of the type available from Raster Technology Corporation. In such configuration, the host computer is still necessary, but the computation of vector of image surface components results from computations performed in the array processor. The data flow is from image mass memory 112 through the array processor 110 to the color display buffer 114, and here again the user input may be via the track ball or ancillary device, as previously described.

Figure 19:
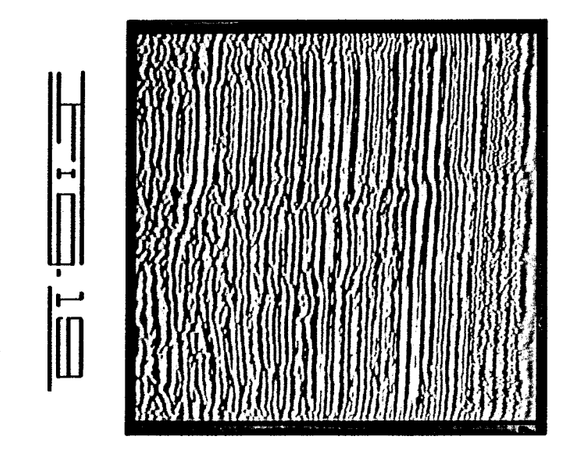
FIG. 19 is a photo-reproduction of a video display of the seismic section of FIG. 3 illustrating improved event continuity.
Figure 20:
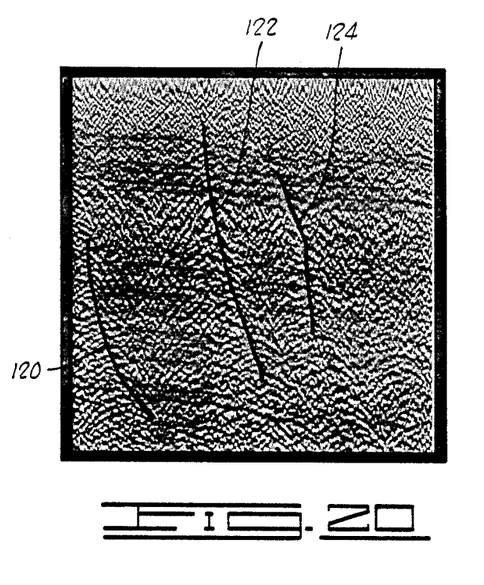
FIG. 20 is a photo-reproduction of video display of the FIG. 3 seismic section illustrating fault enhancement.

Some illustrative results from dip filter processing in accordance with the present method appear in FIGS. 19, 20, 21 and 22. FIGS. 19 and 20 are derived from processing of the input seismic section 27 of FIG. 3, an example of faulted sub-terrain. Thus, in the section depicted in FIG. 19, the operator has achieved a data assemblage that shows markedly improved event continuity. This can be a valuable interpretation tool as it enables events to be followed with greater ease. In FIG. 20, the same data has been interactively varied relative to an illumination model to stress certain generally vertical fault relationships. Accurately located fault lines may then be identified by overmarking, such as fault lines 120, 122 and 124.

Figure 21:
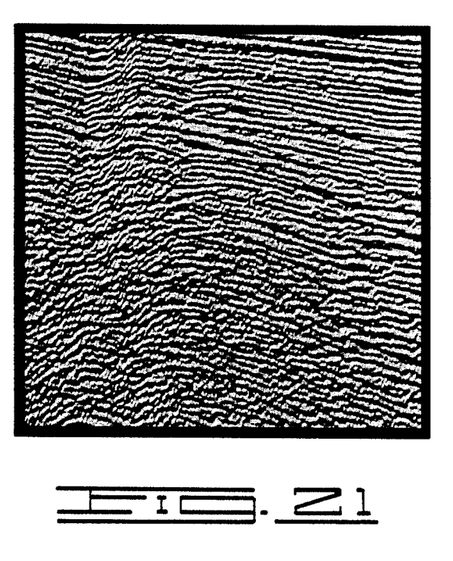
FIG. 21 is a photo-reproduction of the seismic section of FIG. 4 illustrating an improved display with coherent noise removal.
Figure 22:
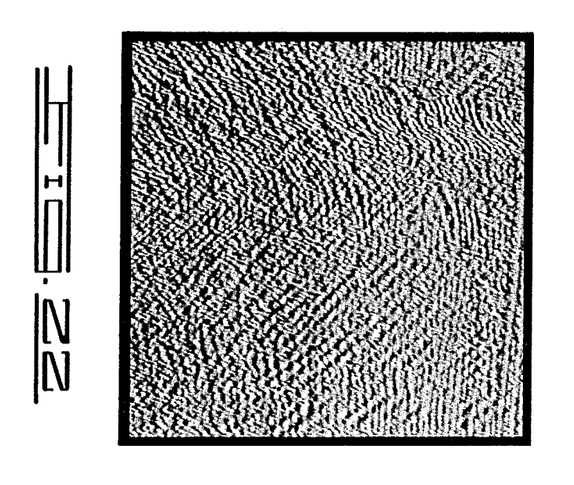
FIG. 22 is a photo-reproduction of the seismic section of FIG. 4 illustrating an example of optimum multiples attenuation.

In FIGS. 21 and 22, the noisy seismic section 28 of FIG. 4, has been processed, and the illumination model has been adjusted to clarify the section response. The depiction of FIG. 21 is a good example of noise removal. The original amplitude attribute seismic section 28 had excessive noise events appearing at around 45° as measured clockwise from horizontal, i.e. in the area 126. The illumination adjusted section of FIG. 21 illustrates the clarification of the data to good advantage. The area 128 of the original seismic section 28 showed presence of excessive multiples, and the modeled display of FIG. 22 has been adjusted to greatly clarify and attenuate multiplies so that some of the horizontal events that were previously masked now become clearly defined.

The real-time seismic dip filtering technique may be readily adapted for color display. If the quantity C is set to be any three seismic attributes as derived from the input section data, these may be combined to make a color display where each of the attribute datum is displayed in positive color, e.g. one of the primary colors. Thus, if $$c \triangleq [r(t,x), g(t,x), b(t,x)] \quad (8)$$

and if the quantity P is a seismic color display of equation (8) converted to the perceivable quantities of brightness, hue and saturation, then $$P \triangleq [B(t,x), H(t,x), S(t,x)] \quad (9)$$

where the transformation T can be made using any of the techniques that are readily found in the literature, $$P = T\{c\} \quad (10)$$

and $$c = T^{-1}\{P\}. \quad (11)$$

The brightness can be replaced for as many components as required. Thus, in the case that four components are required, an h function can be defined such that $$B(t,x) = h\left(\frac{\partial i(t,x)}{\partial t}, B\right) \quad (12)$$

-continued $$B_x(t,x) = h\left(\frac{\partial i(t,x)}{\partial t}, B\right)$$

$$B_{-t}(t,x) = h\left(\frac{-\partial i(t,x)}{\partial t}, B\right)$$

$$B_{-x}(t,x) = h\left(-\frac{\partial i(t,x)}{\partial t}, B\right)$$

where h creates four new brightnesses by modulating the original brightness in proportion to any seismic attribute, i(t, x), that has been operated upon four times. For example, in the present case, the attribute is operated upon by partial derivative operators in two orthogonal directions and their negatives. These relationships would then be $$C_t = T^{-1}[B_t,H,S] = T^{-1}[P_t] \quad (13)$$

$$C_x = T^{-1}[P_x]$$

$$C_{-t} = T^{-1}[P_{-t}]$$

and $$C_{-x} = T^{-1}[P_{-x}].$$

In one mode of operation, the four color components can be used to produce a real-time seismic dip filter adhering to the relationship $$C_{out} = \begin{cases} -\cos\phi(C_t\cos\theta + C_x\sin\theta) + \sin\phi; & \text{for } -180° \leq \theta \leq -90° \\ \cos\phi(C_t\cos\theta + C_x\sin\theta) + \sin\phi; & \text{for } 0° \leq \theta \leq 90° \\ \cos\phi(C_{-t}\cos\theta + C_x\sin\theta) + \sin\phi; & \text{for } 90° \leq \theta \leq 180° \\ \cos\phi(C_t\cos\theta + C_{-x}\sin\theta) + \sin\phi; & \text{for } -90° \leq \theta \leq 0°. \end{cases} \quad (14)$$

The reason for defining this relationship is to interactively enhance events or faults in a color seismic display while at the same time attenuating other structure without ever altering the chromatic portion of the display.

Another definitely viable alternative in the method to construct a real-time seismic dip filter is to use a look-up table as opposed to the prior dot product processing. Letting $$i_t = \frac{\partial i(t,x)}{\partial t} \quad (15)$$

and letting Pr(x=X) be the probability that an event x is less than or equal to an ultimate outcome X. Then, $$Pr\{i_t = I_t\} = \int_{-\infty}^{I_t} p(i_t)di_t \quad (16)$$

where p($i_t$) is the probability density function of the seismic events, $i_t$. If there are then N locations in the look-up tables, the values $N_t$ and $N_x$ can be selected so that $$N = N_t N_x \quad (17)$$

where $N_t$ is the number of probability regions into which the outcomes of all $i_t$ events can be divided, and $N_x$ is similar for all $i_x$ events. The size of equally probable outcomes can be approximated for the events $i_t$, $i_x$ by the relationships $$\Delta P_t = \frac{100}{N_t}$$

and $$\Delta P_x = \frac{100}{N_x}.$$

The set of $i_{tk}$ can then be chosen such that $$P_r\{i_t \leq I_t\} = K\Delta P_t; \text{ for } K=0,1,\cdots,N_t. \quad (19)$$

and similarly, the set of $i_{xL}$ is chosen such that $$P_r\{i_x \leq I_x\} = L\Delta P_x; \text{ for } L=0,1,\cdots,N_x. \quad (20)$$

Codes for indexes may then be generated for each event $i_t$, $i_x$ by $$d_{KL} = KN_x + L \quad (21)$$

such that $$\{i_{tK} \leq i_t \leq i_{tK+1}, i_{xL} \leq i_x \leq i_{xL+1}\} \quad (22)$$

for $K = 0,1,\ldots,N_t - 1$ and $L = 0,1,\ldots,N_x - 1$.

After coding the two sets of data corresponding to all events $i_t$, $i_x$; a look-up table Q can then be defined such that $$i_{KL} = Q(d_{KL})$$

where $$i_{KL} = [i_K, i_L]$$

and $$i_K = \frac{i_{TK} + i_{tK+1}}{2} \quad (23)$$

$$i_L = \frac{i_{xL} + i_{xL+1}}{2}.$$

The relationship $$O(t,x) = -\cos\phi(i_K\cos\theta + i_L\sin\theta) + \sin\phi \quad (24)$$

can then be output in real-time using the look-up table Q, and this greatly reduces the image processing hardware requirements. Thus, all that is needed is a display buffer and a look-up table that is capable of being written at video speeds. The results for monochromatic seismic data are virtually undiscernible from the image produced by the dot product technique.

The foregoing disclosure describes a novel seismic data processing method that effects constitution of a real-time seismic dip filter by using an illumination model. The invention brings about an interactive seismic processing method that merges 3-D graphics and image processing hardware and software concepts, and the technique operates in real-time to provide an output data display that is a most effective aid in interpretation of seismic data. The method serves to provide instantaneous feedback for geologic concept development by allowing interactive enhancement of dipping structures, attenuation of seismic multiples, delineation of faults, improvement of seismic event continuity and the like. In addition, the present method functions in real-time and avoids the time-consuming requirement of multiple processing runs to examine seismic data under specific differing conditions. The operator is capable of defining optimum parameters interactively and virtually instantaneously for a given seismic data set.

Changes may be made in combination and arrangements of procedural steps as heretofore set forth in this specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. A method for enhanced display of seismic data, comprising:
   inputting selected attribute seismic section data;
   orienting said seismic section data in a predetermined multidimensional display format relative to a preselected apparent viewing angle; and
   adjusting the apparent illumination angle to establish a preferentially highlighted display of selected portions of the seismic section;
   said apparent illumination angle being established by transforming a selected vector of images of the seismic section data in accordance with an illumination model of selected angular relationship, said selected vector of images being a vector that is normal to the viewing surface presenting the data at every sample point;
   said apparent illumination angle being determined for an illumination point that is disposed at an angle theta from a reference point around to the illumination position relative to the plane of the viewing surface, and at an angle phi from the plane of the viewing surface to the illumination position as projected on a unit vector hemisphere that would contain said viewing surface, said angle theta determining filter orientation and said angle phi determining overall surface brightness being varied interactively to optimally enhance the output display of the seismic section data.

2. A method for real-time dip filter processing of seismic data, comprising:
   inputting multidimensional seismic data that is a data subset for selected subterrain of interest;
   processing said seismic data to generate at least one surface component of a predetermined vector of images;
   transforming the vector of images in accordance with parameters of an illumination model oriented by at least one selected control vector and relating said selected control vector to a selected angle of orientation and display brightness characterizing a selected illumination angle; and
   generating a dip filter display.

3. A method as set forth in claim 2 wherein said step of processing comprises:
   generating a multidimensional seismic data section from said input seismic data; and
   deriving the vector of images from said multidimensional seismic data section and determining the surface components as the partial derivative with respect to the x direction, the partial derivative with respect to the y direction, and a normalization factor.

4. A method as set forth in claim 2 wherein:
   said angle of orientation is represented as an angle theta in the plane of display taken from a reference to the point of illumination, and said display brightness is represented as an angle phi taken from the plane of display to the point of illumination on a unit vector hemisphere overlying said plane of display.

5. A method for real-time dip filter processing of seismic data, comprising:
   inputting multidimensional seismic data that is a data subset for selected subterrain of interest;
   processing said seismic data to generate at least one surface component of a predetermined vector of images;
   transforming the vector of images in accordance with parameters of an illumination model oriented by at least one selected control vector; and
   generating a dip filter display in accordance with the function $$P_j(\overline{N} \cdot \overline{L}_j)^c_j$$

for all points j where $\overline{N}$ is the vector of images, $\overline{L}$ is the control vector, P is the display brightness and c is the display contrast.

6. A method as set forth in claim 5 wherein:
   the control vector $\overline{L}$ is a function of a filter angle theta and a brightness angle phi of an illumination model where theta is the angle in the plane of display from a reference to the point of illumination, and phi is the angle taken from the plane of display to the point of illumination on a unit vector hemisphere overlying said plane of display.

7. A method as set forth in claim 6 wherein:
   said filter angle theta and brightness angle phi are interactively varied to sharpen and enhance desired characteristics of the output display.

8. A method as set forth in claim 7 wherein:
   said data values for display brightness P and display contrast c may also be interactively varied.

9. A method as set forth in claim 5 wherein said step of processing comprises:
   generating a multidimensional seismic data section from said input seismic data; and
   deriving the vector of images from said multidimensional seismic data section and determining the surface components as the partial derivative with respect to the x direction, the partial derivative with respect to the y direction, and a normalization factor.

* * * * *